United States Patent [19]

Ruger et al.

[11] Patent Number: 4,643,517

[45] Date of Patent: Feb. 17, 1987

[54] METHOD AND CIRCUIT ARRANGEMENT FOR FREQUENCY-, DISTANCE-, AND ANGLE-INDEPENDENT SURFACE MEASUREMENT

[75] Inventors: James Ruger, Hoffenheim; Manfred Strauss, Heidelberg; Wolfgang Welz, Bammental, all of Fed. Rep. of Germany

[73] Assignee: Eltro GmbH, Heidelberg, Fed. Rep. of Germany

[21] Appl. No.: 724,984

[22] Filed: Apr. 19, 1985

[30] Foreign Application Priority Data

Apr. 21, 1984 [DE] Fed. Rep. of Germany ....... 3415043

[51] Int. Cl.[4] .............................................. G02B 26/10
[52] U.S. Cl. ...................................... 350/6.6; 356/386
[58] Field of Search .................................. 350/6.6, 6.8; 356/357–359, 383, 394, 398, 27, 380, 386, 387

[56] References Cited

U.S. PATENT DOCUMENTS

| | | | |
|---|---|---|---|
| 3,178,510 | 4/1965 | Rosin et al. | 356/383 |
| 3,899,663 | 8/1975 | Pirlet | 356/386 |
| 4,063,820 | 12/1977 | Borgese | 356/386 |
| 4,067,652 | 1/1978 | Bohlander | 356/386 |

Primary Examiner—John K. Corbin
Assistant Examiner—Loha Ben
Attorney, Agent, or Firm—Michael N. Meller

[57] ABSTRACT

A method and circuit arrangement for performing surface measurements to enable a beam source to be triggered such that changes in the oscillation frequency, maximum scanning angle, and distance from the measurement surface of the scanner are automatically compensated for. In one embodiment an alternating voltage proportional to the lateral displacement of the impinging beam from a reference point is generated and then compared with a stepped reference voltage. A trigger signal is produced when the alternating voltage equals the reference voltage, so that the beam impinges at equidistant intervals. The reference voltage is adjusted to compensate for changes in distance and maximum scanning angle. In another embodiment, a pulse sequence is generated such that the number of pulses occurring in the scanning cycle is constant. The pulses are counted and the count is compared with reference values corresponding to equiangular intervals. A trigger signal is output if the count equals the reference value.

21 Claims, 8 Drawing Figures

METHOD AND CIRCUIT ARRANGEMENT FOR FREQUENCY-, DISTANCE-, AND ANGLE-INDEPENDENT SURFACE MEASUREMENT

FIELD OF THE INVENTION

This invention relates to a method for making measurements at equal intervals with respect to a common reference point, independent of the oscillation frequency of the scanner, the distance of the scanner from the measuring surface, and the maximum scanning angle, as well as a circuit arrangement for carrying out this method. In particular, the invention relates to a method for triggering a beam source in a manner that automatically compensates for changes in the scanner's oscillation frequency, distance from the scanned surface, or maximum scanning angle.

BACKGROUND OF THE INVENTION

A measuring arrangement for examining the surface finish and smoothness of a workpiece surface is disclosed in DE-AS 22 56 736. According to this prior art reference, a scanning beam is periodically moved over the surface of interest by means of a deflecting element. The scanning beam is reflected or scattered back to the same deflecting element and then deflected to a plurality of adjacent detectors, which output feedback signals representing the condition of the object surface.

U.S. Pat. No. 4,422,764 discloses an interferometer apparatus for measuring the microtopography of surfaces in two dimensions (surface roughness) using monochromatic light from a laser. The laser beam passes through a beam splitter 32 such that part of the beam impinges on reflector 38 and part impinges on the surface 12 of interest. The phase of the reflected beam is linearly varied by a means which applies a sawtooth wave to an electromechanical transducer on which the reflector is mounted. The beams from the reflector and the surface are recombined by the beam splitter and the interference fringe is detected, thus producing an alternating current signal the phase change of which is a measure of the topography of the surface.

Furthermore, GB-OS 2 106 654 discloses a measuring arrangement for observing variations in topography and/or material properties of the surface layer of a body. A capacitance probe 11 is scanned across the surface by means of a scan generator 14. Variations in the capacitance between the probe and the surface are converted into signals representing the topography and/or material properties.

The above-discussed references are all suitable for detecting the topography of a manufactured workpiece, which detection can be performed under controlled laboratory conditions. In a laboratory, the distance between the beam source and the object surface can be maintained constant. Also, in all of these prior art references the object is moved relative to a fixed detection system in order to carry out scanning. Thus, these references are not concerned with scanning systems, for example, mounted aboard vehicles, which themselves are moving and scan the object surface between a maximum and minimum scanning angle of the beam. Furthermore, these references neither disclose nor suggest a method and apparatus for automatically compensating for changes in the distance between the scanner and the object, changes in the maximum scanning angle, and changes in the oscillation frequency of the scanner.

SUMMARY OF THE INVENTION

It is an object of the first embodiment of the invention to provide a method and system for measuring a surface at equidistant intervals along the surface.

The object of the second embodiment of the invention is to provide a method and system for measuring a surface at equiangular intervals along the scanning cycle.

A further object of the invention is to provide means for generating triggering signals for a sinusoidally oscillating scanning system such that the beam source is enabled at predetermined angles such that the beam impinges at equidistant intervals along the measurement surface. This object is achieved in accordance with a method comprising the steps of converting the displacement of the scanning beam along the measurement surface into a proportional alternating voltage u, applying an equally subdivided reference voltage $u_{ref}$ in incremental steps, comparing the proportional alternating voltage u with the respectively incremented values of the reference voltage $u_{ref}$ between the maximum and minimum amplitudes of a scanning cycle, and outputting a triggering pulse in response to each occurrence of equality between the voltages u and $u_{ref}$ as detected by a comparator. The advantage of this method is that the length of the equidistant intervals at which the beam impinges on the measurement surface can be automatically adjusted to compensate for fluctuations in oscillation frequency. This method can be simply realized by providing a displacement transducer which outputs a voltage u proportional to the sinusoidal displacement of the impinging beam, a switchable reference voltage source which outputs a stepped reference voltage $u_{ref}$, and a comparator for outputting a trigger signal when alternating voltage u and reference voltage $u_{ref}$ are equal.

Another object of the invention is to provide triggering signals for a sinusoidally oscillating scanning system such that the beam source is enabled at equiangular increments during the scanning cycle. This object is achieved in accordance with a method comprising the steps of setting a constant maximum angular position $\beta_{max}$ for a scanner, determining the fixed angular positions $\beta_n$ at which the scanner will be enabled, subdividing the time axis from the start to the end of a scanning cycle into discrete time intervals $\Delta t$, counting the number $A_n$ of discrete time intervals, $\Delta t$ corresponding to the triggering time $t_n$ at which a triggering signal is to be output to the beam source. The advantage of this method is that despite variations in the oscillation frequency, which are dependent on manufacturing tolerances, symptoms of aging, and the like, a constant fixed angular relationship is maintained. What changes is solely the time intervals between pulses, in correspondence to the oscillation frequency. This method can be relatively simply realized by linearly distributing a predetermined number of pulses along the time axis as the angular displacement varies sinusoidally and subsequently counting the pulses. Thereby, in practice all of the magnitudes of the desired triggering times can be obtained by calculation.

BRIEF DESCRIPTION OF THE DRAWINGS

The preferred embodiments of the invention will be described in detail with reference to the drawings, wherein.

DETAILED DESCRIPTION OF THE PREFERRED EMBODIMENTS

Figure 1:
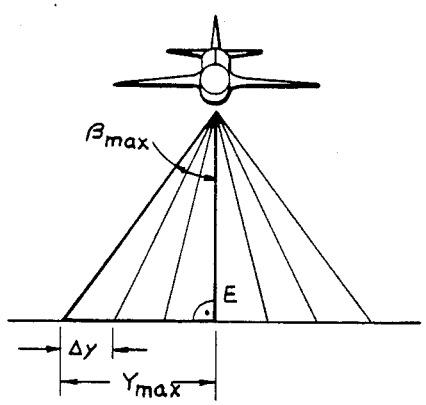
FIG. 1 shows the principle of operation in accordance with the measurement method carried out by a first preferred embodiment.

In the first preferred embodiment, the scanning system, for example, comprising a beam source and a mirror or prism (not depicted), oscillates sinusoidally as depicted in FIG. 1. However, the present invention is intended to apply to triangular, sawtooth, or other forms of scanning, as long as the displacement during repeated scanning cycles is monotonous, i.e., uniform.

As shown in FIG. 1 the instantaneous displacement y of the scanning beam along a measuring surface is calculated as follows:

$$y = y_{max} \cdot \sin \omega t \quad (1)$$

The displacement transducer 1 (see FIG. 1) outputs an alternating voltage u, corresponding to the instantaneous displacement y, as follows:

$$u = u_{max} \cdot \sin \omega t \quad (2)$$

Based on the geometrical relationship of the scanning system and the measurement surface, we obtain:

$$y_{max} = E \cdot \tan \beta_{max} \quad (3)$$

where E is the shortest distance between the scanner and the measuring surface, and $\beta_{max}$ is the maximum scanning angle of the scanner measured relative to the angular mid-position. Equations (1)–(3) can be combined to obtain the following:

$$u = \frac{u_{max} \cdot y}{E \cdot \tan \beta_{max}} \quad (4)$$

As can be seen from equation (4), for constant distance E, the instantaneous alternating voltage u is proportional to the distance y. In other words, u equals the distance y multiplied by a constant and increases until the maximum distance $y_{max}$ is reached. Thus, as the distance y, as measured from the mid-position, respectively doubles, triples, etc., the alternating voltage u will also double, triple, etc.

This knowledge can be used in a novel way to produce a sequence of triggering pulses, which are rendered independent of the scanning function, for performing measurements at equidistant intervals on a measuring surface. This applies both for moving and stationary measuring surfaces. Likewise, the site from which the measurements are made can be in motion or statically fixed. In practice, this means that the measurement method of the present invention can be carried out aboard a spacecraft, airplane or ship, as if performed under a microscope, equally well on moving or stationary measuring objects.

The distance E from the scanning system to the measuring object can be automatically or manually derived. The input of this value into the circuit arrangement for carrying out the measurement method of the invention is denoted by arrow E in FIG. 4. It is, for example, possible, in particular where fast-moving flows are concerned, that the distance E can be determined by a distance-measuring laser system operating by the pulse propagation time principle. The measurement can be carried out by sending beams over the scanning surface of the oscillating system, which beams are transmitted in the direction of the measuring object by the laser sender, reflected by the measuring object, and then received by the laser receiver. By using the manual method instead, any conventional length-measuring system can be used. Thus, the distance E can be determined either automatically or manually.

Figure 3:
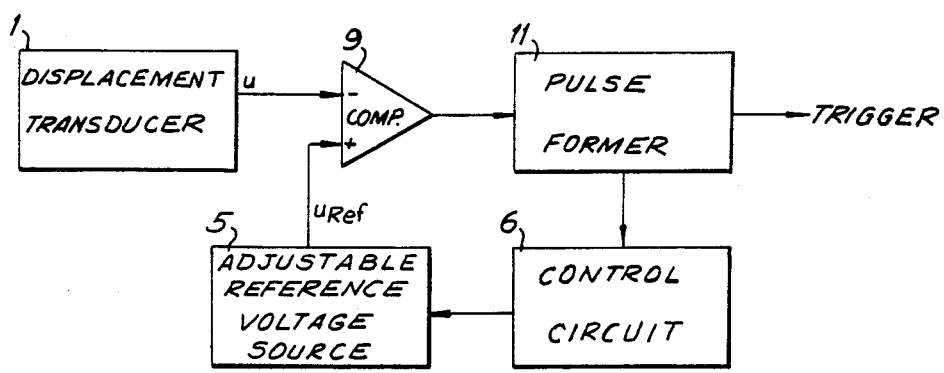
FIG. 3 is a block diagram of the circuit arrangement of the first embodiment for carrying out the measurement operation of the present invention.

The production of the triggering pulse sequence takes place in accordance with FIG. 3. The alternating voltage u output by the displacement transducer 1 is applied to the inverting input terminal of a comparator 9, whereas the individual "voltage step"—generating reference voltage source 5 applies the $u_{ref}$ signal to the non-inverting terminal of comparator 9. The number of steps or increments generated by the reference voltage source 5 is established by means of the doubling of the quotient $y_{max}/\Delta y$, where $\Delta y$ is the length of each of the equidistant increments (FIG. 1) and corresponds to the reference voltage increment $\Delta u_{ref}$.

Figure 2:
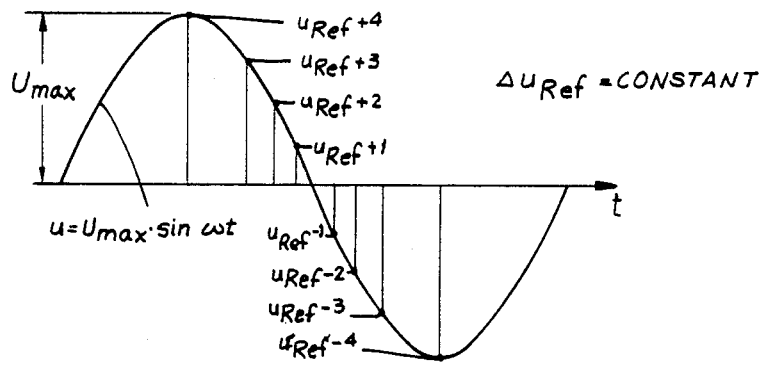
FIG. 2 shows a sinusoidal curve u for the oscillating scanning system indicating the individual steps of the reference voltage $u_{ref}$ needed for the measurement operation of the first embodiment.

The alternating voltage u is greater or less than the reference voltage $u_{ref}$ as applied to the input terminals of comparator 9. Comparator 9 outputs a signal to reflect a change of condition, which signal is converted into a trigger signal by the pulse former 11 for use in the measurement procedure. The triggering signal is also applied to the reference voltage source 5, which is thereby switched to the next reference voltage value $u_{ref}$. This is carried out until all of the increments between the maximum and minimum amplitudes depicted in FIG. 2 are run through.

Figure 4:
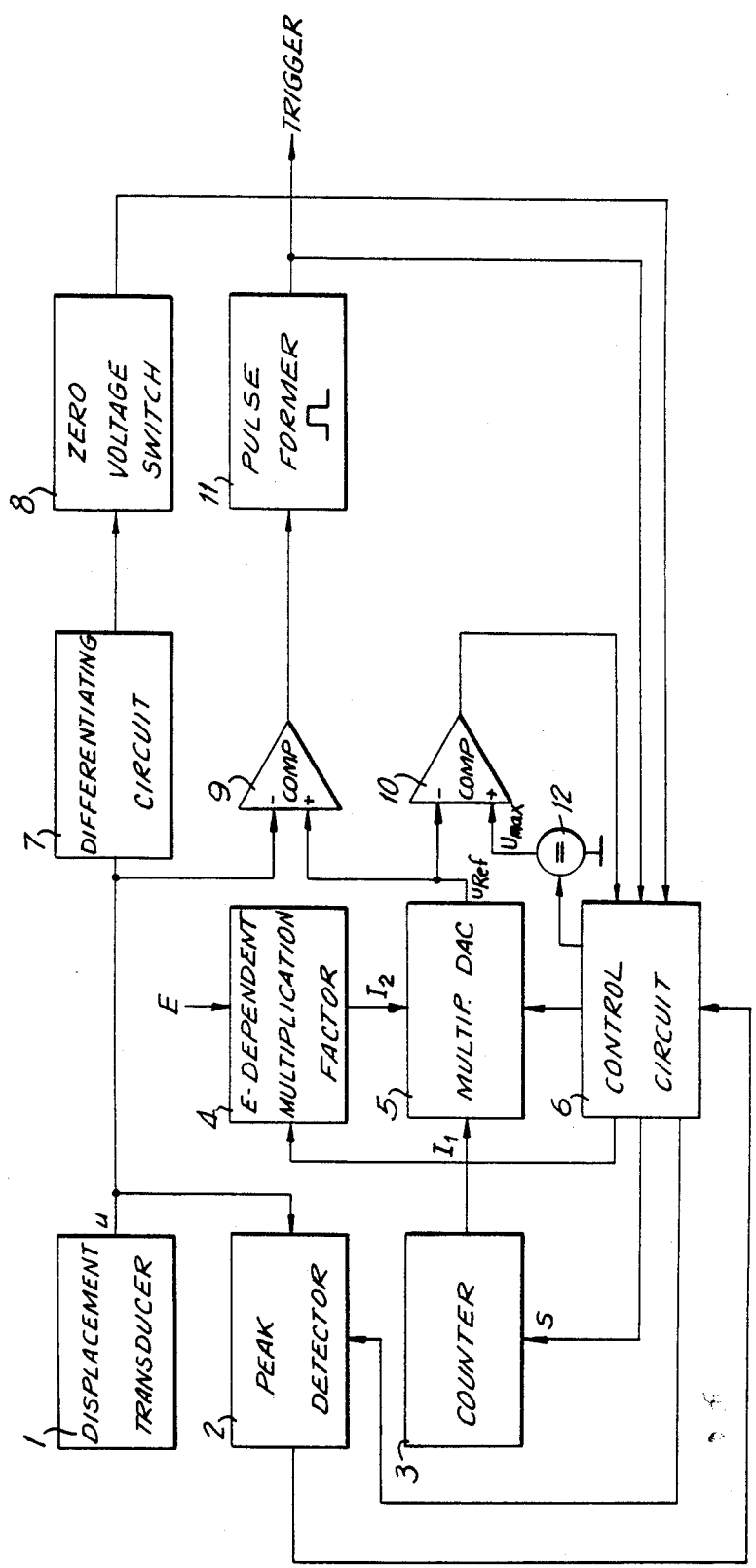
FIG. 4 is a more detailed block diagram of the embodiment depicted in FIG. 3.

A further embodiment, depicted in FIG. 4, considers the dependence of distance $\Delta y$ (see FIG. 1) along the measuring surface on distance E and scanning angle $\beta_{max}$. Substituting the incremental values $\Delta u_{ref}$ and $\Delta y$ into equation (4), we obtain:

$$u_{ref} = \frac{u_{max} \cdot \Delta y}{E \cdot \tan \beta_{max}} \quad (5)$$

In the event of variation of E, the reference voltage increment $\Delta u_{ref}$ must be multiplied by a correction factor in order to maintain the proportionality between the distance increment of $\Delta y$ and the reference voltage increment $\Delta u_{ref}$. Upon slight modification of equation (5), where E is set equal to $E_{ref} \pm \Delta E$, we get:

$$E_{ref} \pm \Delta E = \frac{U_{max} \cdot \Delta y}{u_{ref} \cdot \left(\frac{E_{ref}}{E_{ref} \pm \Delta E}\right) \cdot \tan \beta_{max}} \quad (6)$$

This yields the aforementioned correction factor, by which the reference voltage increment $\Delta u_{ref}$ must be multiplied:

$$k_{cor} = \frac{E_{ref}}{E_{ref} \pm \Delta E} \quad (7)$$

Equation (4), can then be used to obtain another correction factor $k_{cor}$ in the event of a change in the scanning angle $\beta_{max}$ (i.e., $\beta_{max}^{ref} \pm \Delta \beta_{max}$) corresponding the peak voltage value $u_{max}$:

$$k'_{cor} = \frac{\tan(\beta_{max}^{ref} \pm \Delta \beta_{max})}{\tan \beta_{max}^{ref}} \quad (8)$$

In the event of variation in $\beta_{max}$, the reference voltage increment $\Delta u_{ref}$ must be multiplied by $k'_{cor}$ in order to maintain the proportionality between $\Delta u_{ref}$ and $\Delta y$. However, the changed scanning angle causes a change in the number of equidistant intervals $\Delta y$, i.e., the steps $\Delta u_{ref}$ through which the adjustable reference voltage source 5 must be switched. The number of these steps is equal to double the quotient:

$$S = \frac{u_{max}}{\Delta u_{ref}} \quad (9)$$

which is identical to the doubled quotient $y_{max}/\Delta y$.

The basic conditions set forth in equations (5) to (9) are realized by the preferred embodiment depicted in FIG. 4. In this embodiment, the reference voltage source 5 is a digital-to-analog converter (DAC), which has a data word applied on its digital data input terminal I1 from the counter 3 and which supplies a voltage corresponding to the necessary reference voltage $u_{ref}$ on its analog output terminal. This voltage $u_{ref}$ is applied, as in the embodiment depicted in FIG. 3, to the non-inverting input terminal of the comparator 9 and is compared with the voltage u applied on the inverting input terminal of the comparator from the displacement transducer 1. In response to the alternating voltage u rising above or falling below the reference voltage $u_{ref}$, a signal representing the momentary equality of u and $u_{ref}$ is produced on the output terminal of the comparator, which after normalization by the pulse former 11 is used as a triggering pulse for enabling the measurement operation, i.e. the energization of the beam source.

The same trigger pulse additionally switches the reference voltage $u_{ref}$. A new reference voltage is produced by the DAC 5 in response to a control signal from control circuit 6 applied to its control terminal and to a new (i.e., incremented) data word from the counter 3 applied to its data input terminal I1, assuming that E is unchanged. This procedure is repeated until all of the reference voltage values $u_{ref}$ have been applied to comparator 9 and a corresponding trigger pulse has been output. These trigger pulses in their timed sequence make it possible to measure the measuring surface in equidistant increments $\Delta y$.

The number of reference voltage steps is determined by means of the following circuit arrangement. The peak voltage detector 2 receives the voltage signal u from the displacement transducer and detects the peak voltage level $u_{max}$. According to which side of the voltage signals u (see FIG. 2) is being detected during the measurement operation, the variable reference voltage source 12 first applies a positive or a negative value to the $u_{max}$ reference signal on the non-inverting input terminal of the second comparator 10. In the blanking interval, during which no measurements are carried out, the value represented by the data word applied on input terminal I1 of the DAC 5 by means of the counter 3 and control circuit 6 is increased (alternatively, decreased) until the reference voltage $u_{ref}$ on the output terminal of the DAC 5 becomes greater than (alternatively, less than) the peak voltage $u_{max}$. The comparator 10 compares $u_{ref}$ and $u_{max}$, and outputs a signal to the control circuit 6 when the threshold is reached.

For example, beginning the trigger pulse sequence on the decreasing side of the cycle of the alternating voltage u from the displacement transducer 1, in the blanking interval when the reference voltage $u_{ref}$ exceeds the peak voltage $u_{max}$, the data word on the input terminal I1 of the DAC 5 is reduced to the next lowest value. This is the beginning of the measurement phase for the first reference voltage $u_{ref}$. The value of the data word applied on input terminal I1 is then reduced in steps, until the reference voltage $u_{ref}$ output by DAC 5 equals the negative value of peak voltage $u_{max}$ output from switchable reference voltage source 12, following the zero crossing by the alternating voltage u. The signal change at the output of comparator 10 when $u_{ref} = u_{max}$ ends the trigger pulse sequence.

The above-discussed correction factor $k_{cor}$ for use in the correction of reference voltage $u_{ref}$ in accordance with equation (7) in response to change in distance E is generated in unit 4. The signal representing $k_{cor}$ is applied to the second input terminal I2 of the DAC 5, wherein the values that are input on terminals I1 and I2 are multiplied and the reference voltage $u_{ref}$ amplified by factor $k_{cor}$ is made available on the output terminal of DAC 5. It should be understood that the DAC 5 outputs a signal $u_{ref}$ representing the product $k_{cor} \cdot n \cdot \Delta u_{ref}$, where n is the count output by the counter 3.

The differentiating circuit 7 and the zero voltage switch 8 series-connected thereto serve to determine the moments in time at which both points of inflection occur, which information is used by the control circuit in the coordination of the running of the program.

Figure 5:
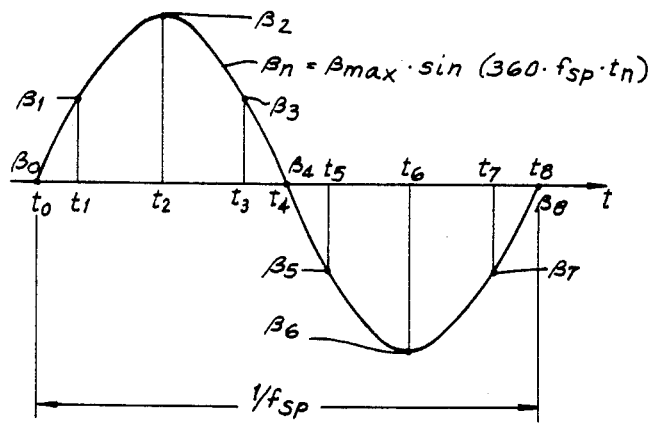
FIG. 5 shows the sine curve $\beta_n$ of the scanning oscillatory system with the individual angular positions for the measurement process carried out by the second preferred embodiment in relation to the triggering times $t_n$.
Figure 7:
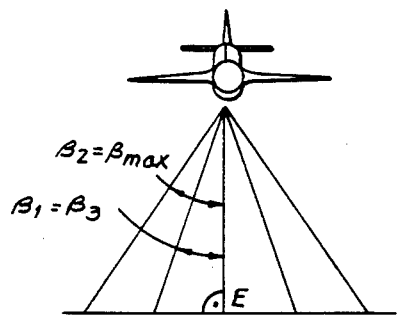
FIG. 7 shows the principle of operation of the measurement method carried out by the second embodiment.

FIG. 5 illustrates the sinusoidal oscillation performed by the scanning system, for example, again comprising a beam source and a mirror or prism (not depicted), which is installed in an airplane, as depicted in FIG. 7. The maximum angular displacement $\Delta_{max}$ of the scanner is maintained constant, whereas the oscillation frequency $f_{sp}$ can be varied in the second preferred embodiment to be described hereinafter. In an oscillating scanning system of this type, the instantaneous angular position $\beta_n$ of the scanner relative to the mid-position can be calculated from the maximum angular position $\beta_{max}$, the time $t_n$ elapsed during scanning from the mid-position to angular position $\beta_n$, and the oscillation frequency $f_{sp}$ in accordance with the following equation:

$$\beta_n = \beta_{max} \sin(360 \cdot f_{sp} \cdot t_n) \quad (10)$$

The maximum oscillation angle $\beta_{max}$ is here measured from the angle corresponding to the mid-position and point of inflection.

Figure 6:
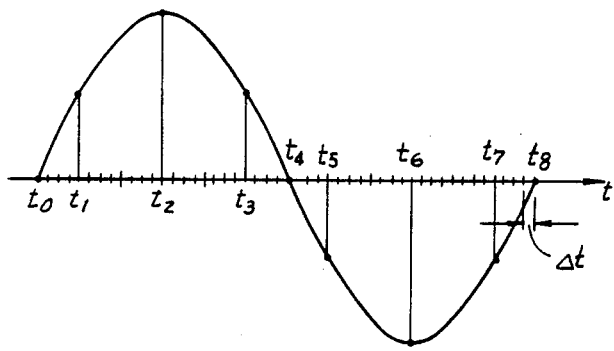
FIG. 6 shows the sine curve $\beta_n$ according to FIG. 1 with the time axis divided into equal time intervals $\Delta t$.

In accordance with the measurement method carried out by a second preferred embodiment, the time $t_n$ is determined, from which the angle $\beta_n$ can be obtained, and the crucial step in this method is the release of trigger signals. To carry this out, the time axis from $t_0$, the start of a scanning cycle, to $t_8$, the end of a scanning cycle, is subdivided into discrete and, for the sake of clarity, equidistant time intervals $\Delta t$, whereby half of the discrete time intervals $\Delta t$ lie between time $t_0$ and time $t_4$, the latter corresponding to the angular mid-position $\beta_4$ of the scanning cycle, and half of the time intervals $\Delta t$ lie between t and $t_8$. As a result of subdividing the time axis in this manner, the triggering time $t_n$ will fall in one of the discrete time intervals $\Delta t$ in accordance with FIG. 6. In order to maintain the trigger error as negligible as possible, the length of the time interval $\Delta t$ must conform to the permissible angular error selected. In order to fix the triggering time $t_n$, the number $A_n$ of discrete time intervals $\Delta t$ from time $t_0$ to the triggering time $t_n$ is determined. This number $A_n$ is determined by counting. The triggering time $t_n$ can be determined by multiplying the discrete time interval $\Delta t$ by the number $A_n$, where the time $t_0$ corresponds to the start of the scanning cycle, from which time $t_n$ the angular position $\beta_n$ can be determined.

Figure 8:
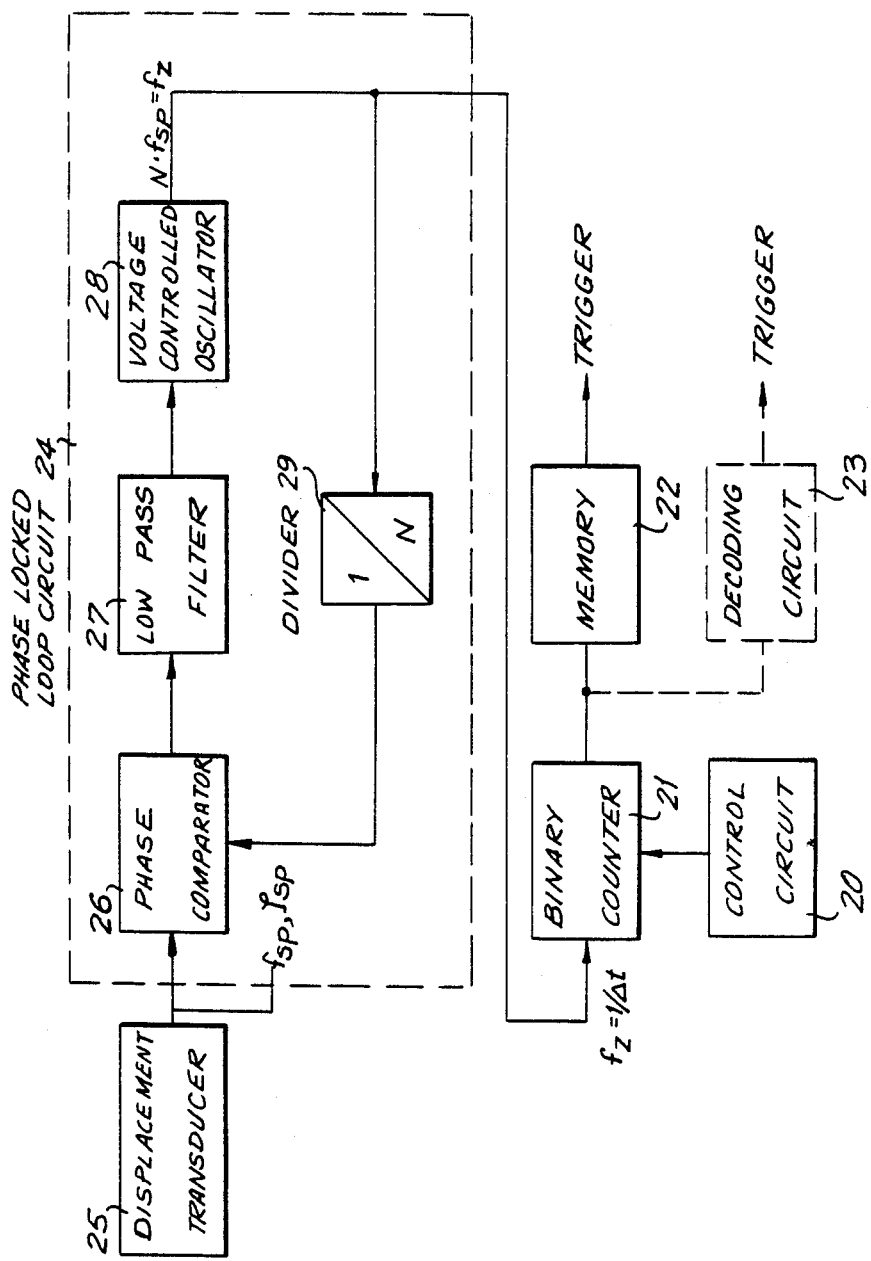
FIG. 8 is a block diagram of the circuit arrangement of the second embodiment for performing the measurement method of the present invention.

The second preferred embodiment of the circuitry for carrying out the method of the present invention is depicted in FIG. 8. The binary counter 21 is triggered by a pulse sequence, the clocking period of which conforms with the discrete time interval $\Delta t$. Binary counter 21 begins its count at time $t_0$, so that when the counter reaches the number $A_n$, the time $t_n$ (i.e., the angular position $\beta_n$) can be obtained. The output of binary counter 21 may be alternatively applied to the address input terminal of memory 22 or to the input terminal of a decoder circuit 23 (indicated by dashed lines). The memory 22 and the decoder circuit 23 each have the task of outputting a predetermined logic signal in response to the output by the binary counter 21 of signals representing any one of the numbers $A_n$ corresponding to the triggering times. For example, the output can be a signal representing the logical "1". This predetermined logic signal enables the production of a triggering signal to the scanner. This lower portion of the circuitry works only if the oscillation frequency $f_{sp}$ of the scanning system is held constant.

As is apparent from equation (10), the triggering time $t_n$ must be changed in accordance with a reciprocal relationship as the oscillation frequency changes in order to obtain the same angular position $\beta_n$. The binary counter 21 hence is connected in series to a digital automatic frequency control circuit 24 which is commercially obtainable under the label of "phase locked loop" (PLL). The data required by the phase locked loop 24, namely the oscillation frequency $f_{sp}$ and the phase angle $\zeta_{sp}$, are obtained from the displacement transducer 25. The phase locked loop 24 comprises a phase comparator 26, a low pass filter 27, and a voltage-controlled oscillator 28 connected in series. This series circuit receives pulsed signals having an oscillation frequency $f_{sp}$ from the displacement transducers and multiplies the frequency of the pulsed signals by a factor N, where $N > 1$. The voltage-controlled oscillator 28 thus outputs pulsed signals having a phase-locked count frequency $f_z$ in accordance with the relationship:

$$f_z = N \cdot f_{sp} \quad (11)$$

The pulsed signals of frequency $f_z$ are output from the voltage-controlled oscillator 28 to the phase comparator 26 by way of divider 29 and to the input terminal of the binary counter 21. The divider 29 divides the count frequency $f_z$ by the factor N.

Furthermore, the following equations, which have already been explained, are valid:

$$t_n = A_n \Delta t \quad (12)$$

$$\Delta t = 1/f_z \quad (13)$$

Assuming this, equation (10) can be reformulated as:

$$\beta_n = \beta_{max} \cdot \sin \frac{360}{N} \cdot A_n \quad (14)$$

It can be deduced from equation (14) that the angular position $\beta_n$ is dependent only on the number $A_n$ of time intervals $\Delta t$, so that all other values can be assumed constant.

Finally, a control circuit 20 is provided which controls the carrying out of the individual functions and, for example, resets the binary counter 21 to zero.

The above-described embodiments are presented for illustrative purposes only, and are not intended to limit the scope of the appended. Variations and modifications can be made by those having ordinary skill in the art, including such variations and modifications, including the substitution of equivalent elements, as fall within the spirit and scope of the claims.

What is claimed is:

1. A method for carrying out measurements on a surface by oscillatory scanning, whereby a beam source is triggered in a pulsed manner at predetermined times, comprising the steps of:
   (a) generating signals representing a scanning function in relation to one of first and second dimensional variables;
   (b) generating a sequence of reference values of said one dimensional variable at each value of which a trigger pulse is to be produced;
   (c) processing said signals to detect those signals representing values equal to said reference values; and
   (d) outputting a trigger pulse in response to each detection of an equality.

2. The method of claim 1, wherein said signals comprise an alternating voltage u, said first dimensional variable is the distance of the impinging beam from a reference point on said surface, said alternating voltage u is proportional to said distance, each of said reference values is represented by a different reference voltage $u_{ref}$, and the difference between consecutive reference voltages equals a constant.

3. The method of claim 2, wherein said alternating voltage u is sinusoidal.

4. The method of claim 2, wherein each trigger pulse is used to trigger the energization of said beam source and to switch the reference voltage to the next value in the sequence of reference values.

5. The method of claim 2, further comprising the steps of determining the distance E from said beam source to said surface, and uniformly adjusting the respective reference values to compensate for variation in the distance E.

6. The method of claim 2, further comprising the step of uniformly adjusting the respective reference values to compensate for variation in the maximum scanning angle $\beta_{max}$.

7. The method of claim 2, further comprising the steps of detecting the peak voltage $u_{max}$ of the alternating voltage u, and comparing the reference voltage $u_{ref}$ with a plus or minus value of the peak voltage depending on which side of the scanning cycle is being traversed.

8. The method of claim 7, further comprising the steps of comparing the reference voltage $u_{ref}$ and the peak voltage $u_{max}$ in the blanking interval between measurements, and stepping the reference voltage $u_{ref}$ if $u_{ref}$ has not equaled or surpassed $u_{max}$ in value.

9. The method of claim 1, wherein said signals comprise a plurality of binary signals representing a count $A_n$, said second dimensional variable is the time measured from the start of the scanning cycle, said count $A_n$ represents the total number of periodic pulses output in sequence at regular time increments $\Delta t$, each of said reference values is represented by a different predetermined stored number corresponding to a respective triggering time $t_n$, and triggering times $t_n$ are selected to correspond to equiangular scanning intervals in dependence on the maximum scanning angle $\beta_{max}$.

10. The method of claim 9, wherein the length of the time increments $\Delta t$ corresponds to the magnitude of the permissible scanning angle error.

11. A circuit arrangement for triggering a beam source in a pulsed manner at predetermined times during oscillatory scanning, said beam source being arranged to project a beam pulse onto a scanned surface in response to a trigger pulse, said circuit arrangement comprising:
    (a) a displacement transducer for generating an alternating voltage u proportional to the distance of the impinging beam from a release point;
    (b) an adjustable reference voltage source for generating a reference voltage $u_{ref}$ in fixed steps;
    (c) a first comparator having first and second input ports connected to said displacement transducer and said adjustable reference voltage source respectively for comparing u and $u_{ref}$ and outputting a signal in response to substantial equality of said u and $u_{ref}$ voltages;
    (d) a pulse former connected to receive said output signal from said first comparator and outputting a trigger pulse in response thereto; and
    (e) a control circuit connected to control said circuit arrangement.

12. The circuit arrangement of claim 11, wherein said adjustable reference voltage source comprises a digital-to-analog converter, and said circuit arrangement further comprises a counter connected to output a count to said digital-to-analog converter and to receive signals from said control circuit, wherein said reference voltage is stepped in accordance with said count.

13. The circuit arrangement of claim 12, further comprising a variable maximum voltage source for generating a maximum voltage $u_{max}$ proportional to the maximum scanning angle $\beta_{max}$, and a second comparator having first and second input ports connected to said digital-to-analog converter and said variable maximum voltage source respectively for comparing $u_{ref}$ and $u_{max}$ and outputting a signal in response to substantial equality of said $u_{ref}$ and $u_{max}$ voltages.

14. The circuit arrangement of claim 13, further comprising a differentiating circuit and a peak detector both connected to receive said alternating voltage from said displacement transducer, and a zero voltage switch connected to said differentiating circuit, wherein the output ports of said pulse former, said zero voltage switch, said second comparator, and said peak detector are connected to said control circuit.

15. The circuit arrangement of claim 12, further comprising a circuit means for outputting a signal representing a multiplication factor to said digital-to-analog converter in response to input of a signal representing the distance of a beam source from the measurement surface.

16. The circuit arrangement of claim 12, wherein the output port of said pulse former is connected to said control circuit, and said control circuit outputs a signal to said counter in response to the output of a trigger pulse by said pulse former.

17. The circuit arrangement of claim 14, wherein said control circuit ends the trigger pulse sequence in response to a signal from said second comparator.

18. A circuit arrangement for triggering a beam source in a pulsed manner at predetermined times during oscillatory scanning, said beam source being arranged to project a beam pulse onto a scanned surface in response to a trigger pulse, said circuit arrangement comprising:
    (a) a displacement transducer coupled to a scanner for outputting pulses corresponding in frequency to the oscillation frequency $f_{sp}$ of said scanner;
    (b) a phase locked loop connected to said displacement transducer for receiving said pulses of frequency $f_{sp}$ and arranged to output pulses of frequency $N.f_{sp}$;
    (c) a binary counter connected to count the pulses output by said phase locked loop;
    (d) circuit means connected to said binary counter for outputting a trigger pulse in response to said binary counter attaining a count $A_n$ corresponding to a predetermined reference value; and
    (e) a control circuit connected to a reset terminal of said binary counter.

19. The circuit arrangement of claim 18, wherein said phase locked loop comprises a phase comparator connected to receive pulses of frequency $f_{sp}$ from said displacement transducer, a low pass filter connected to said phase comparator filtering said pulses of frequency $f_{sp}$, an oscillator connected to said low-pass filter for receiving said filtered pulses of frequency $f_{sp}$ and connected to said binary counter for outputting pulses of frequency $N.f_{sp}$ thereto, where N is an integer greater than unity, and a divider connected to said oscillator for receiving said pulses of frequency $N.f_{sp}$ and connected to said phase comparator for outputting pulses of frequency $f_{sp}$ thereto.

20. The circuit arrangement of claim 18, wherein said circuit means comprises a memory having a plurality of address input terminals connected to receive binary signals representing the count value in said binary counter, said memory being adapted to output a trigger signal in response to receipt of binary signals representing a predetermined value $A_n$, said value $A_n$ corresponding to a scanning angle $\beta_n$ at which said beam source is to be energized.

21. The circuit arrangement of claim 18, wherein said circuit means comprises a decoding circuit connected to receive binary signals representing the count value in said binary counter, said decoding circuit being adapted to output a trigger signal in response to receipt of a predetermined sequence of binary signals representing a value $A_n$, said value $A_n$ corresponding to a scanning angle $\beta_n$ at which said beam source is to be energized.

* * * * *